US012804779B2

(12) United States Patent
Shank et al.

(10) Patent No.: US 12,804,779 B2
(45) Date of Patent: Nov. 17, 2026

(54) APPARATUS AND FLUID HEATING THERMAL TRANSFER EXTRUSION

(71) Applicant: UUSI, LLC, Reed City, MI (US)

(72) Inventors: David W. Shank, Hersey, MI (US); Justin L. Paquette, Manton, MI (US)

(73) Assignee: UUSI, LLC, Reed City, MI (US)

( * ) Notice: Subject to any disclaimer, the term of this patent is extended or adjusted under 35 U.S.C. 154(b) by 1073 days.

(21) Appl. No.: 17/889,288

(22) Filed: Aug. 16, 2022

(65) Prior Publication Data

US 2024/0064872 A1 Feb. 22, 2024

(51) Int. Cl.
*H05B 3/82* (2006.01)
*B60S 1/48* (2006.01)

(52) U.S. Cl.
CPC ................ *H05B 3/82* (2013.01); *B60S 1/487* (2013.01)

(58) Field of Classification Search
None
See application file for complete search history.

(56) References Cited

U.S. PATENT DOCUMENTS 1,728,377 A * 9/1929 Trane ...................... F24H 3/004 219/544
2,405,722 A * 8/1946 Villier ...................... F28F 1/14 165/181
2,646,972 A * 7/1953 Schmid ................. F28D 1/0391 165/184
2,797,295 A * 6/1957 Aitken-Smith ......... F24H 3/004 392/377
2,890,319 A * 6/1959 Watrous, Jr. ............ H01J 17/26 422/167
2,944,138 A * 7/1960 Goff ........................ F24H 3/002 219/544
3,002,729 A * 10/1961 Welsh ....................... F28F 1/20 D25/120
3,143,592 A * 8/1964 August ............... F28D 15/0275 257/722
3,145,456 A * 8/1964 Johnson ............... B21D 53/045 29/890.038
3,163,207 A * 12/1964 Schultz ............... H01L 23/4006 165/68
3,217,793 A * 11/1965 Coe ..................... H01L 23/4006 257/722
3,267,564 A * 8/1966 Keyes ....................... B21C 1/22 D25/120
3,280,907 A * 10/1966 Hoffman ............. H01L 23/4093 165/185
3,301,319 A * 1/1967 Merrill ..................... B01D 8/00 165/185

(Continued)

*Primary Examiner* — Thor S Campbell
(74) *Attorney, Agent, or Firm* — Howard & Howard Attorneys PLLC

(57) ABSTRACT

An apparatus for heating fluid for use on a vehicle surface includes an extrusion extending axially, a first port extending axially through the extrusion adapted to receive a heating element and a second port spaced axially from the first port and extending axially through the extrusion adapted to receive a thermal sensor and a thermal fuse, and at least one fin extending axially along the extrusion and radially oriented about the first port and the second port, whereby the heating element conveys heat to the extrusion which then transfers thermal energy to fluid flowing past the at least one fin.

22 Claims, 4 Drawing Sheets

(56) References Cited

U.S. PATENT DOCUMENTS

| | | | | |
|---|---|---|---|---|
| 3,396,458 | A * | 8/1968 | Meng | H05B 3/50<br>338/238 |
| 3,437,132 | A * | 4/1969 | Venema | H01L 23/473<br>257/E23.098 |
| 3,495,657 | A * | 2/1970 | Norval | F28F 13/06<br>29/890.039 |
| 3,536,893 | A * | 10/1970 | Cranley | H05B 3/80<br>392/443 |
| 3,566,958 | A * | 3/1971 | Zelina | H01L 23/4093<br>174/16.3 |
| 4,104,509 | A * | 8/1978 | Van Bokestal | H01C 1/02<br>219/505 |
| 4,147,927 | A * | 4/1979 | Pirotte | H05B 3/78<br>219/241 |
| 4,296,539 | A * | 10/1981 | Asami | F28F 1/12<br>29/890.07 |
| 4,352,008 | A * | 9/1982 | Hofer | H05B 3/50<br>219/505 |
| 4,414,052 | A * | 11/1983 | Habata | H05B 3/14<br>165/185 |
| 4,558,209 | A * | 12/1985 | Hess | H05B 3/50<br>174/559 |
| 4,782,892 | A * | 11/1988 | Ostbo | F28F 7/02<br>165/DIG. 397 |
| 4,822,980 | A * | 4/1989 | Carbone | H05B 3/82<br>219/205 |
| 5,174,371 | A * | 12/1992 | Grillo | F28F 1/22<br>165/171 |
| 5,343,362 | A * | 8/1994 | Solberg | H01L 23/4093<br>257/361 |
| 5,578,978 | A | 11/1996 | Zoerner | |
| 5,991,151 | A * | 11/1999 | Capriz | H01L 23/4093<br>174/16.3 |
| 6,068,051 | A * | 5/2000 | Wendt | H01L 23/3675<br>361/720 |
| 6,180,930 | B1 * | 1/2001 | Wu | H05B 3/50<br>219/535 |
| 6,499,359 | B1 | 12/2002 | Washeleski et al. | |
| 6,720,535 | B2 * | 4/2004 | Hess | H05B 1/0205<br>219/209 |
| 6,852,955 | B1 * | 2/2005 | Golan | C09J 9/02<br>219/505 |
| 7,066,235 | B2 | 6/2006 | Huang | |
| 7,132,642 | B2 | 11/2006 | Shank et al. | |
| 7,162,928 | B2 | 1/2007 | Shank et al. | |
| 7,293,467 | B2 | 11/2007 | Shank et al. | |
| 7,335,855 | B2 * | 2/2008 | Von | H05K 1/0212<br>219/520 |
| 7,355,148 | B2 * | 4/2008 | Boussier | F24H 3/002<br>219/544 |
| 7,513,166 | B2 | 4/2009 | Shank et al. | |
| 7,908,927 | B2 | 3/2011 | Washeleski et al. | |
| 8,009,740 | B2 | 8/2011 | Strom | |
| 9,338,827 | B2 * | 5/2016 | Braun | H02B 1/565 |
| 9,389,062 | B2 | 7/2016 | Washeleski et al. | |
| 9,661,688 | B2 * | 5/2017 | Mangold | F24H 3/0411 |
| 10,976,761 | B2 * | 4/2021 | Silk | F24H 1/102 |
| 11,002,465 | B2 * | 5/2021 | Liu | H05B 3/04 |
| 2002/0158062 | A1 * | 10/2002 | Hess | H05B 1/0205<br>219/209 |
| 2002/0185270 | A1 * | 12/2002 | Mccullough | H01L 23/4093<br>165/905 |
| 2003/0005775 | A1 | 1/2003 | Washeleski et al. | |
| 2003/0209288 | A1 | 11/2003 | Huang | |
| 2004/0238162 | A1 * | 12/2004 | Seiler | F28F 3/04<br>165/148 |
| 2005/0092097 | A1 | 5/2005 | Shank et al. | |
| 2006/0117862 | A1 | 6/2006 | Shank et al. | |
| 2007/0089527 | A1 | 4/2007 | Shank et al. | |
| 2008/0011093 | A1 | 1/2008 | Shank et al. | |
| 2009/0158857 | A1 | 6/2009 | Shank et al. | |
| 2010/0084110 | A1 | 4/2010 | Strom | |
| 2011/0163764 | A1 | 7/2011 | Shank et al. | |
| 2011/0226458 | A1 * | 9/2011 | Plonski | H01L 21/4882<br>165/185 |
| 2013/0263672 | A1 | 10/2013 | Washeleski et al. | |
| 2021/0148152 | A1 | 5/2021 | Murree | |
| 2021/0232283 | A1 | 7/2021 | Shank | |

* cited by examiner

APPARATUS AND FLUID HEATING THERMAL TRANSFER EXTRUSION

BACKGROUND OF THE INVENTION

1. Field of the Invention

The present invention relates generally to fluid heating and, more particularly to, an apparatus and fluid heating thermal transfer extrusion for fluid heating for use on a vehicle surface.

2. Description of the Related Art

Spatial sensing devices, such as cameras, radars, lidars, etc., that may be disposed on a vehicle, have lenses or other outer surface portions that serve to separate and thus protect sensing elements from external elements. Such protection may include protection from impingement of water, snow, mud, road salt, dust, bugs, and other airborne elements. On a vehicle employing autonomous operation, reduction in an ability to dynamically detect objects or perform another sensing function may affect a capability of the autonomous operation, which may lead to disablement of the autonomous function until the lens or outer surface portion is cleaned.

SUMMARY OF THE INVENTION

Accordingly, the present invention provides an apparatus for heating fluid for use on a vehicle surface includes an extrusion extending axially, a first port extending axially through the extrusion adapted to receive a heating element and a second port spaced axially from the first port and extending axially through the extrusion adapted to receive a thermal sensor and a thermal fuse, and at least one fin extending axially along the extrusion and radially oriented about the first port and the second port, whereby the heating element conveys heat to the extrusion which then transfers thermal energy to fluid flowing past the at least one fin.

These and other objects, advantages, and features of the present invention will become better understood from the following detailed description of one exemplary embodiment of the present invention that is described in conjunction with the accompanying drawings.

DETAILED DESCRIPTION OF THE PREFERRED EMBODIMENT(S)

Figure 1:
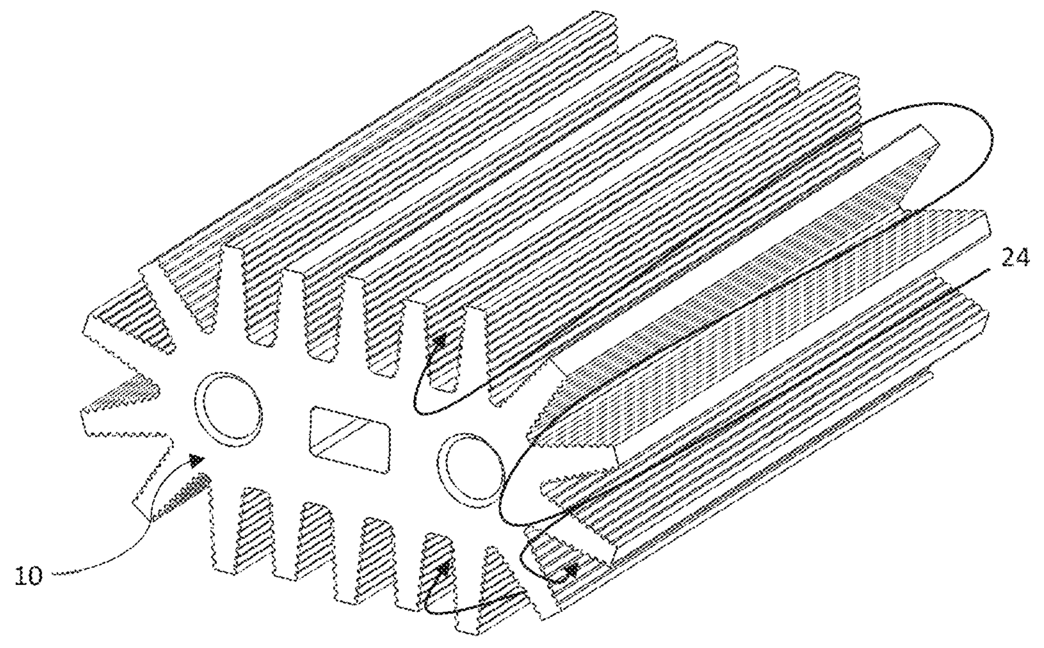
FIG. 1 is a perspective view of a fluid heating thermal transfer extrusion in accordance to one embodiment of the present invention.

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for clarity, certain technical material that is understood in the related art has not been described in detail in order to avoid unnecessarily obscuring the disclosure. For purposes of convenience and clarity only, directional terms such as top, bottom, left, right, up, over, above, below, beneath, rear, and front, may be used with respect to the drawings. These and similar directional terms are not to be construed to limit the scope of the disclosure. As employed herein, the term "upstream" and related terms refer to elements that are towards an origination of a flow stream relative to an indicated location, and the term "downstream" and related terms refer to elements that are away from an origination of a flow stream relative to an indicated location. Furthermore, the disclosure, as illustrated and described herein, may be practiced in the absence of an element that is not specifically disclosed herein. Like numerals refer to like elements throughout the specification and drawings.

Referring now to the drawings, which are provided for the purpose of illustrating certain exemplary embodiments only and not for the purpose of limiting the same, the present invention concerns an apparatus for heating fluid for use on a vehicle surface. An exemplary apparatus has a port for receiving a heating element and another port for containment of a thermal sensor and a thermal fuse. The apparatus has an extrusion with fins radially oriented about the ports containing heating elements, thermal sensor, and thermal fuse. The heating element conveys heat to the extrusion which then transfers the thermal energy to fluid flowing past the fins of the extrusion.

Referring to FIG. 1, the apparatus for heating fluid is an extrusion 10 having features that provide a structured flow path 24 for fluid so that the fluid gains thermal energy as the fluid flows in a serpentine manner around the extrusion 10. The flow path 24 starts from an end of the extrusion 10 and then divides evenly between two sides of extrusion 10, thereby reducing the pressure drop across the extrusion 10 from an inlet to an outlet.

Figure 2:
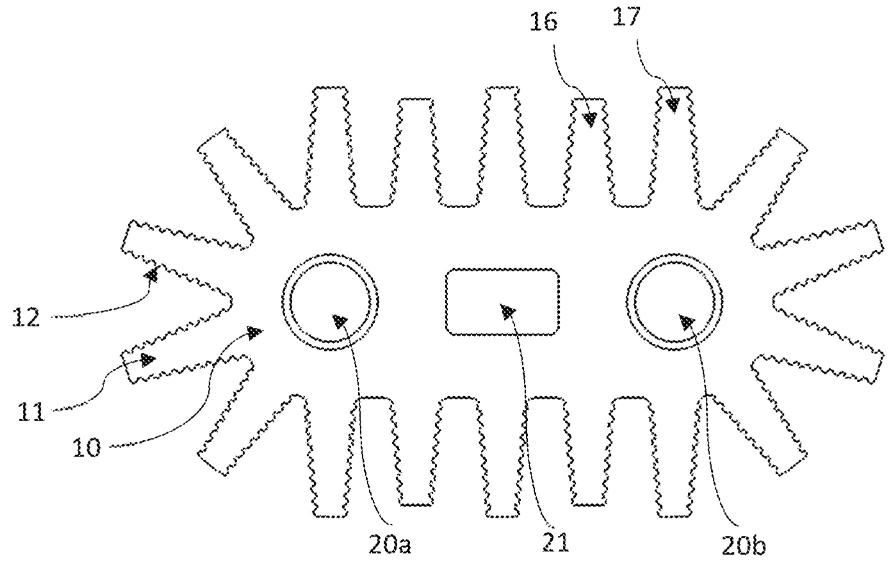
FIG. 2 is a front view of the fluid heating thermal transfer extrusion of FIG. 1.

As illustrated in FIG. 2, the extrusion 10 includes one or more ports 20*a*, 20*b* for receiving at least one heating element and another port 21 for receiving and containment of a thermal sensor and a thermal fuse. The extrusion 10 includes an extrusion member extending axially and having one or more fins, such as fins 11, 16, and 17, extending axially and radially. The fins are generally rectangular in shape, but may be any suitable shape. The extrusion 10 includes one or more ports 20*a*, 20*b* extending axially through the extrusion member. The ports 20*a*, 20*b* are generally circular in cross-sectional shape, but may be any suitable cross-sectional shape. The fins are radially oriented about the ports 20*a*, 20*b* containing the heating elements, thermal sensor, and thermal fuse. The heating elements located in ports 20*a* and 20*b* convey heat to the extrusion 10 which then transfers the thermal energy to fluid flowing past the fins of the extrusion 10. The apparatus includes a chamber designed to receive the extrusion 10 and provides the structured flow path 24. The structured flow path 24 is generally serpentine so as to maximize the time that fluid is in contact with the fins of the extrusion 10. It should be appreciated that the extrusion 10 is integral, unitary, and one-piece.

Figure 3:
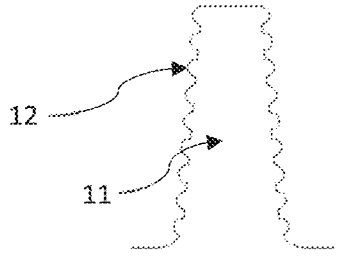
FIG. 3 is an enlarged view of a fin with rib detail of the fluid heating thermal transfer extrusion of FIG. 2.

The fins of the extrusion 10 have details such as rounded convolutes 12 shown in FIG. 2 and detailed in FIG. 3. The rounded convolutes 12 provide an additional 25% in surface area of the extrusion 10, thereby allowing for increased transfer of thermal energy to fluid flowing around the fins of the extrusion 10.

Figure 4:
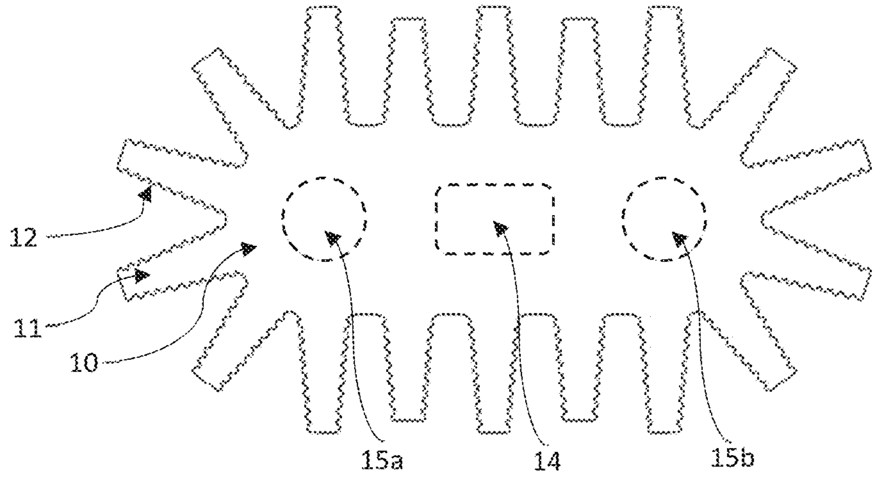
FIG. 4 is a rear view of the fluid heating thermal transfer extrusion of FIG. 1 with inserts pressed into openings thereof.
Figure 5:
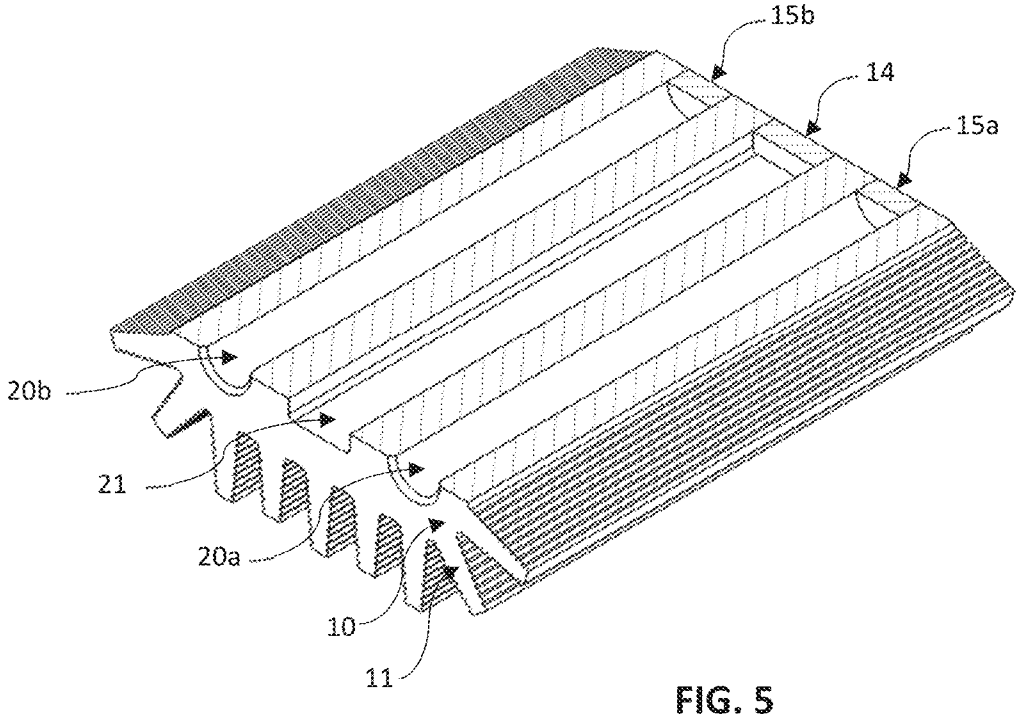
FIG. 5 is a cross-sectional view of the fluid heating thermal transfer extrusion of FIG. 4.

Referring now to FIG. 4 and FIG. 5, the extrusion 10 is shown with the fins and ports 20*a*, 20*b*, and 21. In one end of the extrusion 10, the apparatus may include plugs 14, 15*a*, and 15*b* inserted to create an open ended cavity inside the extrusion 10 to accommodate the insertion of the heating elements into the ports 20*a* and 20*b*, and the insertion of thermal sensor and thermal fuse into port 21.

Figure 6:
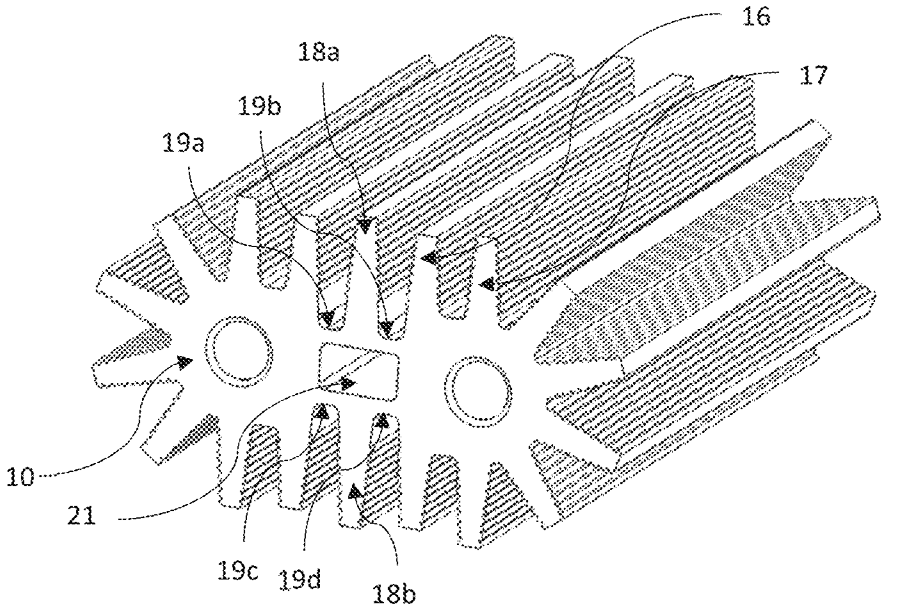
FIG. 6 is a perspective view of the fluid heating thermal transfer extrusion of FIG. 1 with optional deeper cuts on either side of a center fin thereof.
Figure 7:
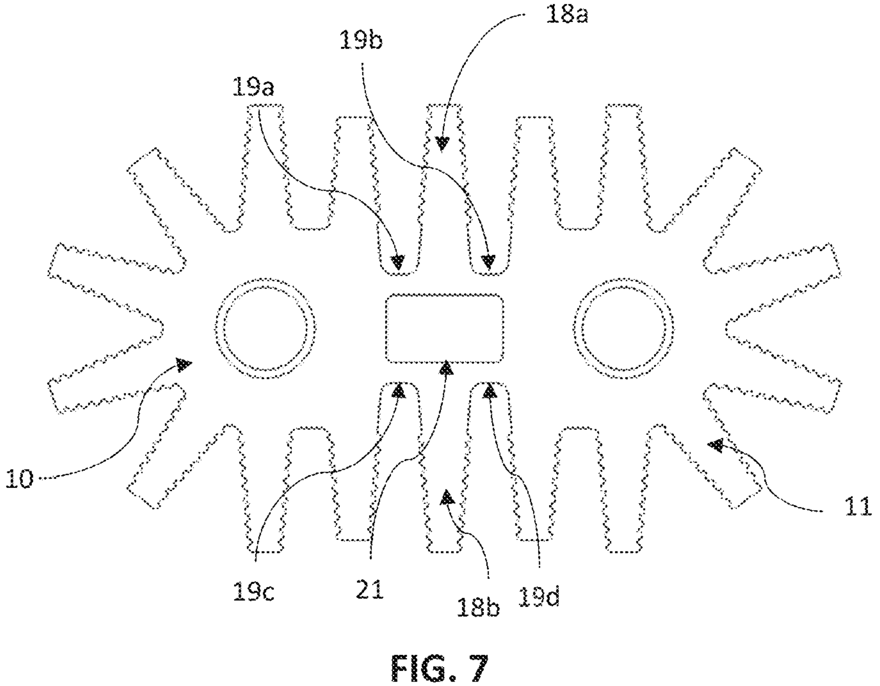
FIG. 7 is a front view of the fluid heating thermal transfer extrusion of FIG. 6.

As illustrated in FIGS. 6 and 7, another embodiment of the extrusion 10 previously described includes radially deeper cuts 19*a*, 19*b*, 19*c*, and 19*d* surrounding fins 18*a* and 18*b*. The extrusion 10 includes a center port 21 extending axially through the extrusion member. The center port 21 is generally rectangular in cross-sectional shape, but may be any suitable cross-sectional shape. The deeper cuts 19*a*, 19*b*, 19*c*, and 19*d* create a thinner wall section between the port 21 and the cuts 19*a*-19*d*, thereby enabling the thermal sensor to more accurately reflect the temperature of the fluid flowing past fins 18*a* and 18*b*. It should be appreciated that the fins 18*a* and 18*b* are similar to the fins 11, 16, and 17.

Figure 8:
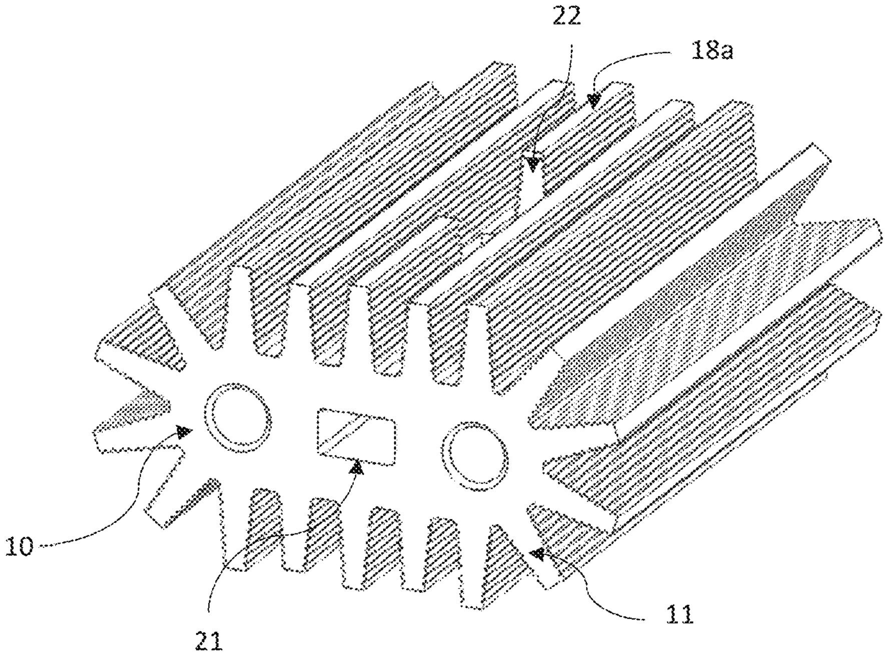
FIG. 8 is a perspective view of the fluid heating thermal transfer extrusion of FIG. 1 with an optional milled area on both sides of the extrusion in middle of the center fin.
Figure 9:
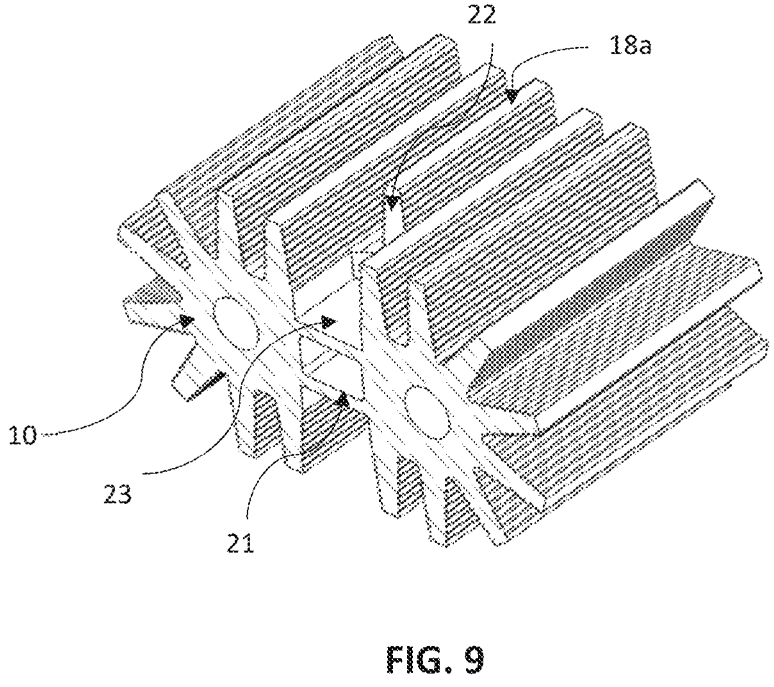
FIG. 9 is a cross-section of a perspective view of the fluid heating thermal transfer extrusion of FIG. 8 showing a reduced thickness of material between a center rectangular extrusion port and an outside surface thereof.

As illustrated in FIGS. 8 and 9, yet another embodiment of the extrusion 10 previously described includes a section of the fins 18*a* and 18*b* removed to create a thinner wall section between the port 21 and a surface 23, thereby enabling the thermal sensor to more accurately reflect the temperature of the fluid flowing past the fins 18*a* and 18*b*.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. An apparatus for heating fluid for use on a vehicle surface comprises:

an extrusion extending axially;

a first port extending axially through the extrusion adapted to receive a heating element and a second port spaced laterally from the first port and extending axially through the extrusion adapted to receive a thermal sensor and a thermal fuse;

at least one fin extending axially along the extrusion and radially oriented about the first port and the second port, whereby the heating element conveys heat to the extrusion which then transfers thermal energy to fluid flowing past the at least one fin; and thinning of sections of the extrusion surrounding the second port to improve accuracy of the sensing of fluid temperature.

2. The apparatus as set forth in claim 1 wherein the extrusion has a symmetrical shape.

3. The apparatus as set forth in claim 1 wherein the extrusion has a symmetry to provide even heating.

4. The apparatus as set forth in claim 1 wherein the extrusion has a flow path, the flow path being divided to reduce pressure drop.

5. The apparatus as set forth in claim 1 including a plurality of fins extending axially along the extrusion and radially oriented about the first port and the second port.

6. The apparatus as set forth in claim 5 wherein the extrusion includes a rounded convolute on the fins.

7. The apparatus as set forth in claim 5 wherein the second port is centrally located to receive the thermal sensor and the thermal fuse for even averaging of temperature from the fins and the heating element.

8. The apparatus as set forth in claim 5 including plugs to create a cavity for the heating element, the thermal sensor, and the thermal fuse.

9. An apparatus for heating fluid for use on a vehicle surface comprises:

an extrusion extending axially;

a first port extending axially into the extrusion adapted to receive a heating element and a second port spaced laterally from the first port and extending axially into the extrusion adapted to receive a thermal sensor and a thermal fuse;

a plurality of fins extending axially along the extrusion and radially oriented about the first port and the second port, whereby the heating element conveys heat to the extrusion which then transfers thermal energy to fluid flowing past the fins; and thinning of sections of the extrusion surrounding the second port to improve accuracy of the sensing of fluid temperature.

10. A fluid heating thermal transfer extrusion for heating cleaning fluid for use on a vehicle surface comprises:

an extrusion member extending axially;

a first port extending axially through the extrusion member and a second port spaced laterally from the first port and extending axially through the extrusion member and a third party spaced laterally from the second port and extending axially into the extrusion member;

at least one fin extending axially along the extrusion, the at least one fin being radially oriented about the first port and the second port and the third port, whereby the extrusion transfers thermal energy to fluid flowing past the at least one fin; and thinning of sections of the extrusion surrounding the second port to improve accuracy of the sensing of fluid temperature.

11. The fluid heating thermal transfer extrusion as set forth in claim 10 including a heating element disposed in the first port.

12. The fluid heating thermal transfer extrusion as set forth in claim 10 including a thermal sensor and a thermal fuse disposed in the second port.

13. The fluid heating thermal transfer extrusion as set forth in claim 10 wherein the extrusion has a symmetrical shape.

14. The fluid heating thermal transfer extrusion as set forth in claim 10 wherein the extrusion has a symmetry to provide even heating.

15. The fluid heating thermal transfer extrusion as set forth in claim 10 wherein the extrusion has a flow path, the flow path being divided to reduce pressure drop.

16. The fluid heating thermal transfer extrusion as set forth in claim 10 including a plurality of fins extending axially along the extrusion and radially oriented about the first port and the second port and the third port.

17. The fluid heating thermal transfer extrusion as set forth in claim 16 including rounded convolutes on the fins.

18. The fluid heating thermal transfer extrusion as set forth in claim 16 wherein the second port is centrally located to receive the thermal sensor and the thermal fuse for even averaging of temperature from the fins and the heating element.

19. The fluid heating thermal transfer extrusion as set forth in claim 16 including a plurality of plugs to create a cavity for the heating element and the thermal sensor and the thermal fuse.

20. A fluid heating thermal transfer extrusion for heating cleaning fluid for use on a vehicle surface comprises:

an extrusion member extending axially;

a first port extending axially into the extrusion member and a second port spaced laterally from the first port and extending axially into the extrusion member; and a plurality of fins extending axially along the extrusion, the fins being radially oriented about the first port and the second port, whereby the extrusion transfers thermal energy to fluid flowing past the fins;

a plurality of plugs to create a cavity for the heating element and the thermal sensor and the thermal fuse; and thinning of sections of the extrusion member surrounding the second port to improve accuracy of the sensing of fluid temperature.

21. A fluid heating thermal transfer extrusion for heating cleaning fluid for use on a vehicle surface comprises:

an extrusion member extending axially and being symmetrical in shape;

a first port extending axially through the extrusion member and a second port spaced laterally from the first port and extending axially through the extrusion member; and a plurality of fins extending axially along the extrusion and having rounded convolutes thereon, the fins being radially oriented about the first port and the second port, whereby the extrusion transfers thermal energy to fluid flowing past the fins; and thinning of sections of the extrusion surrounding the second port to improve accuracy of the sensing of fluid temperature.

22. A fluid heating thermal transfer extrusion for heating cleaning fluid for use on a vehicle surface comprises:

an extrusion member extending axially;

a first port extending axially into the extrusion member and a second port spaced laterally from the first port and extending axially into the extrusion member and a third port spaced laterally from the second port and extending axially into the extrusion member, wherein the first port and the third port each have a circular cross-section, and the second port has a rectangular cross-section;

a first heating element disposed in the first port and a second heating element disposed in the third port;

a thermal sensor and a thermal fuse disposed in the second port;

at least one fin extending axially along the extrusion, the at least one fin being radially oriented about the first port and the second port and the third port, whereby the extrusion transfers thermal energy to fluid flowing past the at least one fin; and thinning of sections of the extrusion surrounding the second port to improve accuracy of the sensing of fluid temperature.

* * * * *